(12) United States Patent
Colli et al.

(10) Patent No.: US 7,759,930 B2
(45) Date of Patent: Jul. 20, 2010

(54) ACTUATOR WITH A NON-CONTACT POSITION SENSOR

(75) Inventors: Marcello Colli, Reggio Emilia (IT); Eugenio Dragoni, Lugo (IT); Nazario Bellato, Bologna (IT); Andrea Baldassari, Bologna (IT)

(73) Assignee: Magneti Marelli Powertrain S.p.A., Viale Aldo Borletti (IT)

( * ) Notice: Subject to any disclaimer, the term of this patent is extended or adjusted under 35 U.S.C. 154(b) by 375 days.

(21) Appl. No.: 11/784,028

(22) Filed: Apr. 5, 2007

(65) Prior Publication Data

US 2007/0245890 A1   Oct. 25, 2007

(30) Foreign Application Priority Data

Apr. 6, 2006   (EP)   ................ 06425241

(51) Int. Cl.
*G01B 7/14*   (2006.01)
(52) U.S. Cl. ............... 324/207.24; 324/207.18; 324/207.19; 324/207.22
(58) Field of Classification Search ............ 324/207.24, 324/207.18, 207.19, 207.22
See application file for complete search history.

(56) References Cited

U.S. PATENT DOCUMENTS

| | | | | |
|---|---|---|---|---|
| 4,291,586 A | | 9/1981 | Buetemeister | ............... 74/335 |
| 4,471,304 A | * | 9/1984 | Wolf | .................. 324/207.24 |
| 5,204,621 A | * | 4/1993 | Hermann et al. | ....... 324/207.18 |
| 5,781,006 A | | 7/1998 | Beichler | ................ 324/207.19 |
| 6,222,360 B1 | | 4/2001 | Tischer et al. | .......... 324/207.18 |
| 2003/0000307 A1 | | 1/2003 | Lohberg | .................. 73/514.16 |

FOREIGN PATENT DOCUMENTS

| | | |
|---|---|---|
| DE | 4208888 | 9/1993 |
| EP | 1286089 | 8/2002 |
| WO | WO97/46815 | 12/1997 |
| WO | WO01/20197 | 3/2001 |

OTHER PUBLICATIONS

European Search Report dated Sep. 4, 2006 based on European Application No. EP06425241.

* cited by examiner

*Primary Examiner*—Reena Aurora
(74) *Attorney, Agent, or Firm*—Ohlandt, Greeley, Ruggiero & Perle, L.L.P.

(57) ABSTRACT

An actuator having a fixed part, a movable part movable with respect to the fixed part in a travelling direction, and a non-contact position sensor connected to the movable part to read the position of the movable part. The position sensor has a reading device connected to the fixed part and having a ferromagnetic core; and a magnetic cursor, which is integrated in the movable part, is defined by a magnetized portion of the movable part, and is so magnetized as to locally saturate the ferromagnetic core at the magnetic cursor.

5 Claims, 2 Drawing Sheets

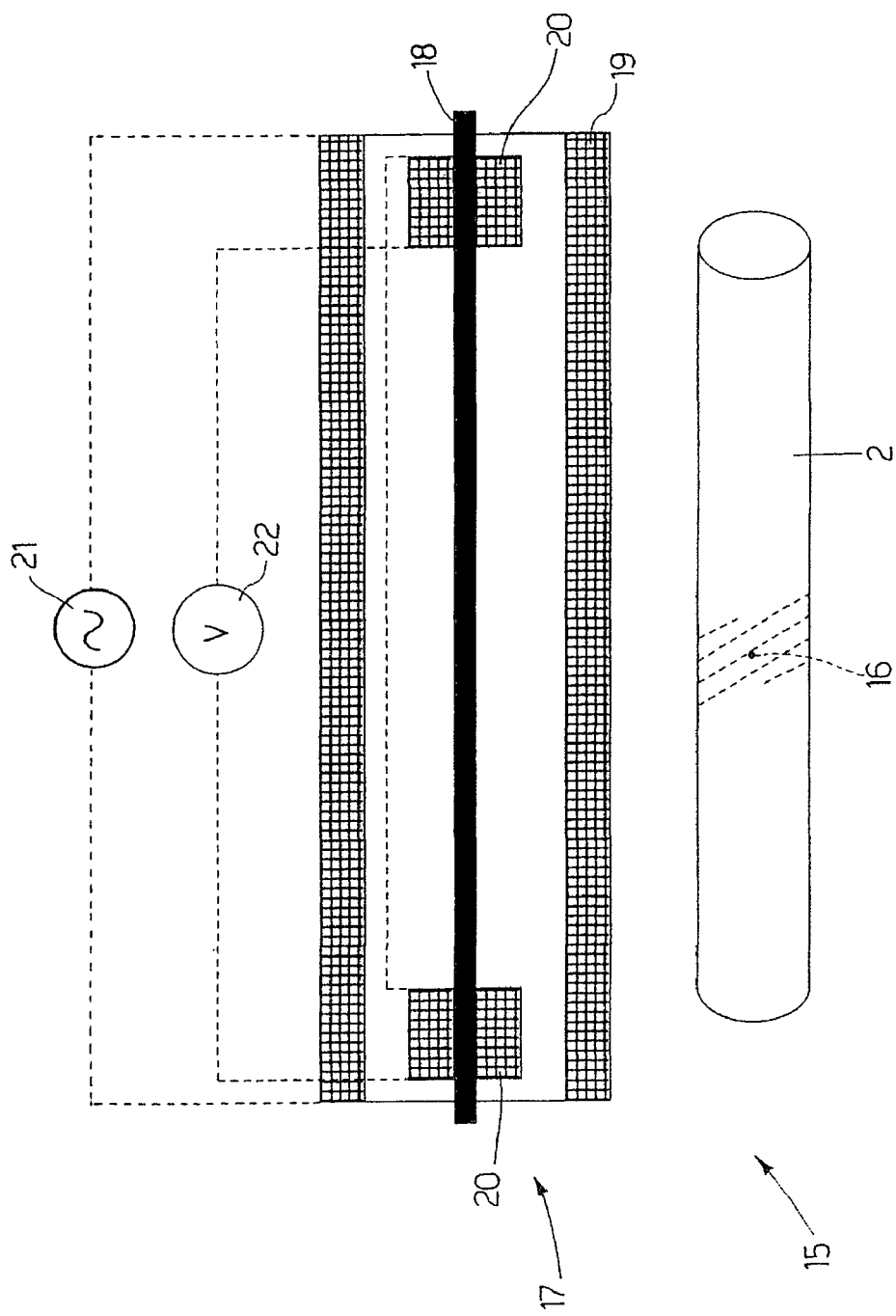

ACTUATOR WITH A NON-CONTACT POSITION SENSOR

CROSS REFERENCE TO RELATED APPLICATIONS

This application claims benefit under 35 U.S.C. §119(a) of European Patent Application No. 06425241.4, filed Apr. 6, 2006, the entire contents of which are incorporated herein by reference.

BACKGROUND OF THE INVENTION

1. Field of the Invention

The present invention relates to an actuator with a non-contact position sensor. The present invention may be used to advantage in a road vehicle power transmission, to which the following description refers purely by way of example.

2. Description of Related Art

Power transmissions are becoming increasingly popular, and are structurally similar to a conventional manual transmission, except that the driver-operated clutch pedal and gear lever are replaced by corresponding electric or hydraulic servocontrols. Using a manual power transmission, the driver simply instructs a central control unit of the transmission to shift up or down, and the central control unit of the transmission acts on both the engine and the clutch and transmission servocontrols to shift gear independently.

The transmission servocontrol is normally hydraulic, and acts on a control shaft of the transmission to move the control shaft axially, i.e. along a central axis, to select the gear rank, and to rotate the control shaft about the central axis to engage and disengage individual gears. The transmission servocontrol therefore comprises a hydraulic linear actuator connected mechanically to the control shaft to move the control shaft axially; and a hydraulic rotary actuator connected mechanically to the control shaft to rotate the control shaft.

To select the gear rank correctly, the linear actuator must ensure precise positioning of the control shaft, especially when selecting a middle rank. That is, when selecting an end rank, the control shaft rests against a limit stop which therefore partly ensures correct positioning of the control shaft, whereas, when selecting a middle rank, the control shaft is mid-way between the two limit stops, so that correct positioning of the control shaft depends solely on the accuracy of the linear actuator.

Accurately positioning the control shaft calls for feedback control of the linear actuator, which means determining the position of the control shaft by means of a position sensor. For this purpose, mechanical position sensors, which have a movable part fixed to the control shaft, and a fixed part located close to the control shaft, have been proposed, but have proved bulky and expensive.

SUMMARY OF THE INVENTION

It is an object of the present invention to provide an actuator with a non-contact position sensor, designed to eliminate the aforementioned drawbacks and which, in particular, is highly compact and both cheap and easy to produce.

According to the present invention, there is provided an actuator with a non-contact position sensor.

BRIEF DESCRIPTION OF THE DRAWINGS

A non-limiting embodiment of the present invention will be described by way of example with reference to the accompanying drawings, in which:

FIG. 2 shows a larger-scale schematic view of a position sensor of the FIG. 1 actuator.

DETAILED DESCRIPTION OF THE INVENTION

Figure 1:
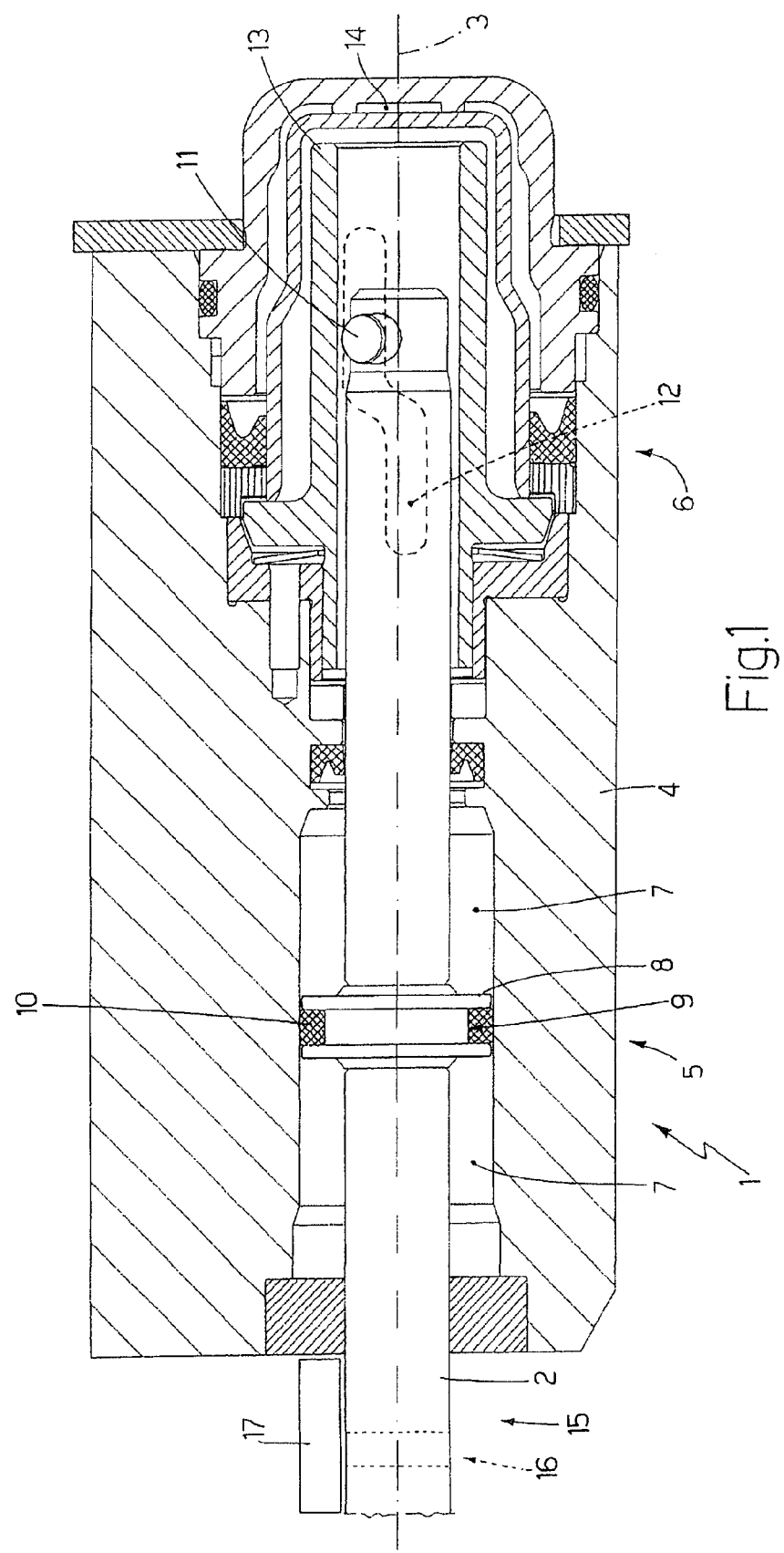
FIG. 1 shows a schematic section, with parts removed for clarity, of a linear actuator in accordance with the present invention.

Number 1 in FIG. 1 indicates as a whole a servocontrol for a transmission having a control shaft 2. Servocontrol 1 acts on control shaft 2 of the transmission to move control shaft 2 axially, i.e. along a central axis 3, to select the gear rank, and to rotate control shaft 2 about central axis 3 to engage and disengage individual gears. Servocontrol 1 of the transmission comprises a fixed frame 4 fitted through with control shaft 2, and which supports a hydraulic linear actuator 5 connected mechanically to control shaft 2 to move control shaft 2 axially, and a hydraulic rotary actuator 6 connected mechanically to control shaft 2 to rotate control shaft 2 about central axis 3.

Linear actuator 5 is located at an intermediate portion of control shaft 2, and has two chambers 7 which are filled alternately with pressurized fluid to move control shaft 2 axially in both directions under the control of two solenoid valves (not shown). More specifically, the two chambers 7 are fitted through with control shaft 2, are arranged in series along control shaft 2, and are separated by a flange 8 integral with control shaft 2 and defining a piston of hydraulic linear actuator 5. Flange 8 comprises a central annular cavity 9 housing an annular seal 10.

Hydraulic rotary actuator 6 is located at the end of control shaft 2 having a pin 11, which projects radially from control shaft 2 and engages a cam 12 carried by a cylindrical tubular member 13 coaxial with control shaft 2. Cam 12, i.e. tubular member 13 supporting cam 12, normally rotates freely about central axis 3, and hydraulic rotary actuator 6 connects cam 12, i.e. tubular member 13 supporting cam 12, angularly integral with fixed frame 4 to rotate control shaft 2 about central axis 3 as control shaft 2 moves axially. In other words, when hydraulic rotary actuator 6 is idle, i.e. when cam 12 is free to rotate with respect to fixed frame 4, the axial movement of control shaft 2 rotates cam 12 about central axis 3, and control shaft 2 performs no rotation about central axis 3; conversely, when hydraulic rotary actuator 6 is activated, i.e. when cam 12 is angularly integral with fixed frame 4, the axial movement of control shaft 2 forces control shaft 2 to rotate about central axis 3 under the control of cam 12.

Tubular member 13 houses an end portion of control shaft 2, and is pushed axially by rotary actuator 6 against fixed frame 4, so as to lock tubular member 13 angularly to fixed frame 4. Rotary actuator 6 comprises a chamber 14, which is filled with pressurized fluid to move tubular member 13 axially under the control of a solenoid valve (not shown).

Control shaft 2 is fitted with a non-contact position sensor 15 which reads the axial position of control shaft 2 (i.e. the position of control shaft 2 along central axis 3); and the axial position reading of control shaft 2 is used by a control unit (not shown) to feedback-control linear actuator 5.

Position sensor 15 comprises a magnetic cursor 16 integrated in control shaft 2; and a reading device 17 parallel to control shaft 2 and located close to control shaft 2, at magnetic cursor 16, to read the axial position of magnetic cursor 16.

Magnetic cursor 16 is integrated in control shaft 2 by comprising a magnetized portion of control shaft 2. In other words, as opposed to being an external part fitted to control shaft 2, magnetic cursor 16 comprises an appropriately treated portion of control shaft 2.

As shown in FIG. 2, reading device 17 comprises a low-coercivity linear ferromagnetic core 18 parallel to control shaft 2 and wound with a primary coil 19 extending along substantially the whole of ferromagnetic core 18. The two ends of ferromagnetic core 18 are wound with two identical secondary coils 20 connected in series so that the magnetic fluxes generated by the two secondary coils 20 are in phase opposition.

In a preferred embodiment, primary coil 19 is wound over secondary coils 20. In alternative embodiments, primary coil 19 is wound beneath secondary coils 20, or is wound alongside secondary coils 20, with no overlapping of secondary coils 20.

Magnetic cursor 16 is so magnetized as to locally saturate ferromagnetic core 18 at magnetic cursor 16. In other words, the portion of ferromagnetic core 18 facing magnetic cursor 16 is affected by a strong enough magnetic field generated by magnetic cursor 16 to magnetically saturate the ferromagnetic material constituting ferromagnetic core 18.

The two terminals of primary coil 19 are connected to the terminals of an alternating voltage generator 21, and the two terminals of the two series secondary coils 20 are connected to the terminals of a voltmeter 22.

In actual use, voltage generator 21 supplies the terminals of primary coil 19 with alternating voltage, which produces alternating electric current flow through primary coil 19; the alternating electric current generates an alternating magnetic field, which links with, to induce alternating voltage in, the two secondary coils 20. The two secondary coils 20 being connected in series, so that the magnetic fluxes generated by the two secondary coils 20 are in phase opposition, the two alternating voltages induced in the two secondary coils 20 are in phase opposition and so tend to cancel each other out.

The values of the two alternating voltages induced in the two secondary coils 20 vary in complementary manner as a function of the position of magnetic cursor 16. More specifically, when magnetic cursor 16 is in an intermediate position between the two secondary coils 20, the two alternating voltages induced in the two secondary coils 20 are identical, so that voltmeter 22 reads a zero voltage between its terminals; conversely, when magnetic cursor 16 is closer to one secondary coil 20, a smaller amount of magnetic flux links with the closer secondary coil 20, and a lower alternating voltage is induced in the closer secondary coil 20 than in the other, so that voltmeter 22 reads, between its terminals, a voltage other than zero and substantially proportional to the distance between magnetic cursor 16 and secondary coil 20.

In other words, the voltage read by voltmeter 22 at the terminals of the two series secondary coils 20 varies linearly between two limit values as a function of the position of magnetic cursor 16.

In the embodiment described above, alternating voltage generator 21 is connected to the terminals of primary coil 19, and voltmeter 22 is connected to the terminals of the two series secondary coils 20; in an alternative, functionally identical embodiment, alternating voltage generator 21 is connected to the terminals of the two series secondary coils 20, and voltmeter 22 is connected to the terminals of primary coil 19.

In a first embodiment, alternating voltage generator 21 supplies the terminals of primary coil 19 with a constant effective alternating voltage value. In an alternative embodiment, alternating voltage generator 21 supplies the terminals of primary coil 19 with a variable effective alternating voltage value to maintain a constant effective alternating electric current value through primary coil 19 (i.e. generator 21 is a "constant-current" generator), and so eliminate the non-linearity effects introduced by any variation in the impedance of primary coil 19 alongside a variation in the position of magnetic cursor 16.

Non-contact position sensor 15 described above has numerous advantages, by being straightforward, economical and compact, and installable with no difficulty whatsoever in an existing actuator. This is mainly due to the movable part of position sensor 15, i.e. magnetic cursor 16, comprising an appropriately magnetized portion of control shaft 2, as opposed to an external part connected to control shaft 2.

Given its numerous advantages, position sensor 15 described above may be used in combination with all the transmission servocontrol actuators, or with a clutch servo-control actuator.

What is claimed is:

1. An actuator comprising:
   a fixed part;
   a movable part comprising a control shaft having a central axis, the movable part being movable with respect to the fixed part in an axially travelling direction along the central axis;
   two chambers that are configured to be alternately filled with a pressurized fluid to move the control shaft axially in both directions along the central axis, wherein the two chambers are fitted through with the control shaft, located in series along the control shaft, are separated by a flange integral with the control shaft, and define a piston of the actuator; and
   a non-contact position sensor connected to the movable part to read the position of the movable part, the non-contact position sensor comprising a reading device and a magnetic cursor, the reading device being connected to the fixed part, the magnetic cursor being integrated in the movable part and being defined by a limited magnetized portion of the movable part,
   wherein the reading device comprises a ferromagnetic core that is parallel to the movable part, has a length along the travelling direction greater than the length of the magnetic cursor, and is magnetized so as to locally saturate the ferromagnetic core at the magnetic cursor and
   wherein the reading device further comprises a primary coil and two identical secondary coils, the primary coil being wound along the whole of the ferromagnetic core, and the two identical secondary coils being wound about two ends of the ferromagnetic core and being connected to each other in series so that magnetic fluxes generated by the two identical secondary coils are in phase opposition and so that values of two alternating voltages induced in the two secondary coils vary in complementary manner as a function of the position of magnetic cursor.

2. The actuator as claimed in claim 1, wherein the reading device comprises:
   an alternating voltage generator connected to terminals of the primary coil; and
   a voltmeter connected to terminals of the two identical secondary coils,
   wherein, when the magnetic cursor is in an intermediate position between the two secondary coils, the two alternating voltages induced in the two secondary coils are identical so that the voltmeter reads a zero voltage between its terminals, and
   wherein, when the magnetic cursor is closer to one secondary coil, a smaller amount of magnetic flux links with the closer secondary coil and a lower alternating voltage is induced in the closer secondary coil than in the other so that the voltmeter reads, between its terminals, a voltage of other than zero and substantially proportional to the distance between the magnetic cursor and the secondary coil.

3. The actuator as claimed in claim 1, wherein the reading device comprises:
   an alternating voltage generator connected to terminals of the two identical secondary coils; and
   a voltmeter connected to terminals of the primary coil,
   wherein, when the magnetic cursor is in an intermediate position between the two secondary coils, the two alternating voltages induced in the two secondary coils are identical so that the voltmeter reads a zero voltage between its terminals, and
   wherein, when the magnetic cursor is closer to one secondary coil, a smaller amount of magnetic flux links with the closer secondary coil and a lower alternating voltage is induced in the closer secondary coil than in the other so that the voltmeter reads, between its terminals, a voltage of other than zero and substantially proportional to the distance between the magnetic cursor and the secondary coil.

4. The actuator as claimed in claim 1, wherein the control shaft is a control shaft of a transmission.

5. A servocontrol for a transmission, comprising:
   an actuator having a fixed part, a movable part comprising a control shaft, and a non-contact position sensor,
   wherein the actuator comprises two chambers that are configured to be alternately filled with a pressurized fluid to move the control shaft axially in both directions along a central axis of the control shaft, the two chambers being fitted through with the control shaft, are located in series along the control shaft, are separated by a flange integral with the control shaft, and define a piston of the actuator,
   wherein the movable part is movable with respect to the fixed part in a travelling direction and the non-contact position sensor is connected to the movable part to read the position of the movable part, the non-contact position sensor comprising a reading device and a magnetic cursor, the reading device being connected to the fixed part, the magnetic cursor being integrated in the movable part and being defined by a limited magnetized portion of the movable part,
   wherein the reading device comprises a ferromagnetic core that is parallel to the movable part, has a length along the travelling direction greater than the length of the magnetic cursor and is magnetized so as to locally saturate the ferromagnetic core at the magnetic cursor, and
   wherein the reading device further comprises a primary coil and two identical secondary coils, the primary coil being wound along the whole of the ferromagnetic core, and the two identical secondary coils being wound about the two ends of the ferromagnetic core and being connected to each other in series so that the magnetic fluxes generated by the two identical secondary coils are in phase opposition and so that the values of the two alternating voltages induced in the two secondary coils vary in complementary manner as a function of the position of magnetic cursor.

* * * * *